United States Patent [19]

Yamada

[11] Patent Number: 5,331,613
[45] Date of Patent: Jul. 19, 1994

[54] DATA REPRODUCING METHOD AND APPARATUS CAPABLE OF SHORTENING THE TOTAL TIME OF DATA REPRODUCTION FOR A PLURALITY OF REPRODUCTION REQUESTS

[75] Inventor: Naoki Yamada, Tokyo, Japan

[73] Assignee: Olympus Optical Co., Ltd., Tokyo, Japan

[21] Appl. No.: 941,385

[22] Filed: Sep. 8, 1992

[30] Foreign Application Priority Data

Sep. 27, 1991 [JP] Japan ............................ 3-248936

[51] Int. Cl.$^5$ ............................................ G11B 17/22
[52] U.S. Cl. ...................................... 369/32; 395/275; 395/425
[58] Field of Search .................. 369/32, 47, 49, 48; 395/275, 425

[56] References Cited

U.S. PATENT DOCUMENTS

4,159,532  6/1979  Getson, Jr. et al. ............... 395/275
5,161,143  11/1994 Fukushima et al. ................ 369/32
5,204,514  4/1993  Horiguchi ........................... 369/32

Primary Examiner—Robert J. Pascal
Assistant Examiner—Tan Dinh
Attorney, Agent, or Firm—Goodman & Woodward Frishauf, Holtz

[57] ABSTRACT

A data reproducing method includes the steps of causing an optical information recording and reproducing apparatus to read first data from an optical information recording and reproducing medium when a first reproduction request is received, and storing the first data in a temporary storage memory. During the processing step of the host computer, the stored first data is processed by the host computer. At the predicting step, second data that specified by a second reproduction request is predicted, on the basis of the first data during at least one of the data processing period of the host computer and the period for storing the first data in the temporary storage memory. During the transferring step, the predicted second data is read from the optical information recording and reproducing medium and then transferred to the temporary storage memory, before the second reproduction request is made.

20 Claims, 7 Drawing Sheets

DATA REPRODUCING METHOD AND APPARATUS CAPABLE OF SHORTENING THE TOTAL TIME OF DATA REPRODUCTION FOR A PLURALITY OF REPRODUCTION REQUESTS

BACKGROUND OF THE INVENTION

1. Field of the Invention

This invention relates to a method of and apparatus for reproducing data recorded on an optical information recording and reproducing medium such as an optical card.

2. Description of the Related Art

To reproduce data recorded on an optical information recording and reproducing medium, the data is read out by an optical information recording and reproducing apparatus, which transfers it to the host computer. Then, there follows data processing including data display on the screen, evaluation of data by the operator, and the printing out of data.

Figure 8:
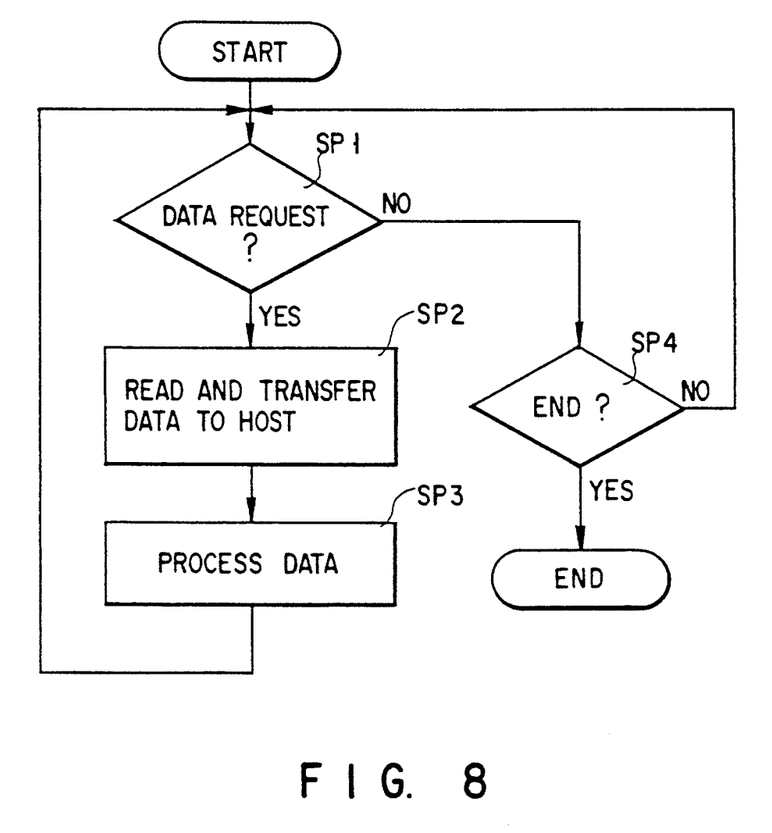
FIG. 8 is a flowchart for explaining a conventional data reproducing method.

Referring to the flowchart in FIG. 8, the above-described data reproducing operation will be explained in detail.

When the program is started, a judgment is made to see if a reproduction request has occurred for the data recorded on the optical information recording and reproducing medium at step SP1. If it has, the optical information recording and reproducing apparatus reads out the data specified by the reproduction request, and transfers it to the host computer (step SP2).

Then, data processing including display on the screen is performed on the transferred data (step SP3). During the data processing, the program is judging whether or not there has occurred a reproduction request for the next data recorded on the medium or a program end request (step SP4).

The time required to read data from the optical information recording and reproducing medium is longer than that required to read data from a magnetic recording medium such as a hard disk or a floppy disk, or from other recording mediums. Because of this, there arose in the FIG. 8 conventional method a problem: it was impossible to shorten the time from when a data reproduction request has occurred to the optical information recording medium until the host computer begins to process the data. With the recent trend of dealing with increasingly large volumes of data such as image data, the shortening of the time required to retrieve the data from the optical information recording medium is a very important problem to be solved in the field of information processing.

SUMMARY OF THE INVENTION

Accordingly, the object of the present invention is to provide a data reproducing method and apparatus capable of shortening the total time required to reproduce the data from the optical information recording medium when a plurality of reproduction requests are made.

One aspect of the foregoing object is accomplished by providing a data reproducing method comprising the steps of: causing an optical information recording and reproducing apparatus to read first data from an optical information recording and reproducing medium at a first reproduction request; storing the first data read in a temporary storage memory; causing a host computer to process the first data stored; predicting second data that may be specified by a second reproduction request, on the basis of the first data during at least one of the data processing period of the host computer and the period for storing the first data in the temporary storage memory; and reading the predicted second data from the optical information recording and reproducing medium and then transferring it to the temporary storage memory, before the second reproduction request is made.

The other aspect of the foregoing object is accomplished by providing a data reproducing apparatus comprising: storing means for storing in a temporary storage memory first data read by an optical information recording and reproducing apparatus from an optical information recording and reproducing medium at a first reproduction request; processing means for processing the first data stored by the storing means; predicting means for predicting second data that may be specified by a second reproduction request, on the basis of the first data during at least one of the data processing period of the host computer and the period for storing the first data in the temporary storage memory; and transferring means for reading the second data predicted by the predicting means from the optical information recording and reproducing medium and then transferring it to the temporary storage memory, before the second reproduction request is made.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figures 1A, 1B:
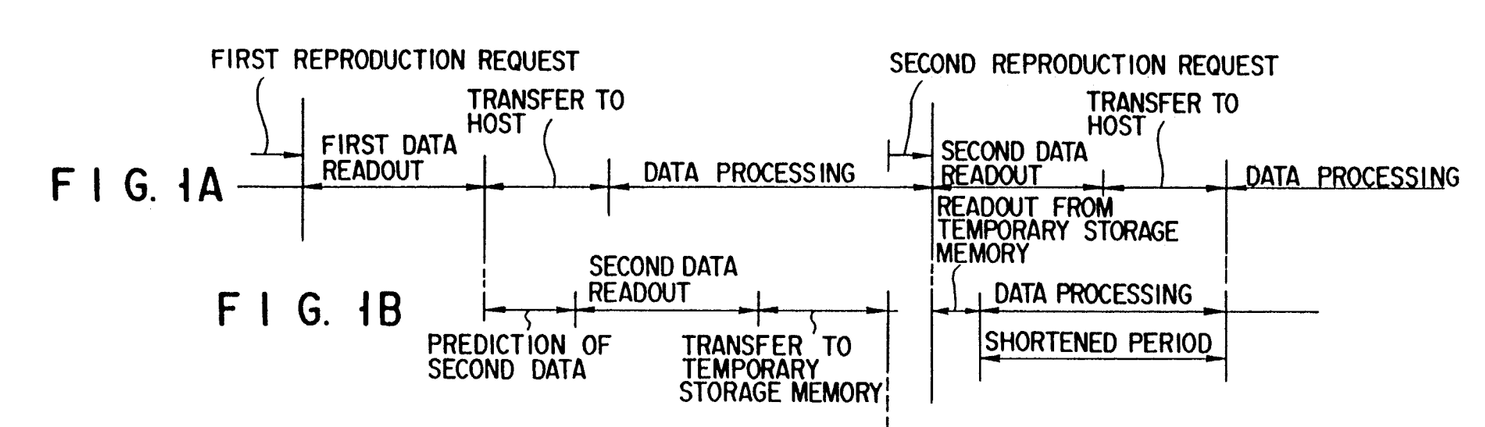
FIGS. 1A, 1B, and 1C are diagrams for explaining an outline of a data reproducing method of the present invention.

Referring to FIGS. 1A and 1B, embodiments of the present invention will be explained. In response to a first reproduction request, the data read section of an optical information recording and reproducing apparatus reads first data from an optical information recording and reproducing medium, and transfers it to the host computer, which performs specified data processing. Conventionally, after the data processing, second data is read in only when a second request occurs, as shown in FIG. 1A. The second data is then transferred to the host computer for data processing.

In the embodiments of the present invention, however, the host computer, based on the first data, predicts the second data to be specified by the second reproduction request during the data processing period of the first data (the data processing period of time may include the time required for the first data to be transferred to the host computer, which is shown in FIG. 1B). After having sent an instruction to read out the predicted second data to the optical information recording and reproducing apparatus, the host computer returns to the processing of the first data.

The second data read by the data read section in response to the read instruction from the host computer, is transferred through DMA (Direct Memory Access) to the temporary storage memory of the host computer before the second reproduction request occurs. This allows the second data to be read from the temporary storage 10 memory, not from the optical information recording and reproducing medium, when the second request actually takes place. This feature helps to reduce the data read time by the amount of period shown in the figure.

DMA transfer in the embodiments enables the host computer to perform the processing of the first data even as the second data is still being transferred to the temporary storage memory. When the processing of the first data is a simple operation such as display on the screen, normal data processing by the CPU, not by DMA transfer, may be used. The interval between the first and second reproduction requests in the present embodiments is, for example, several minutes.

Figure 1C:
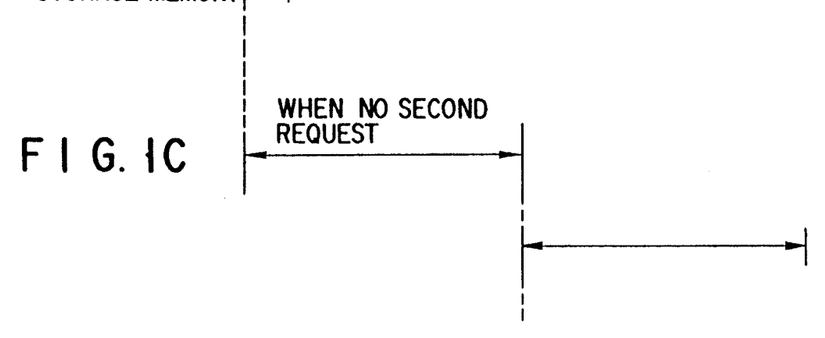

FIG. 1C shows a case where there is no second request.

Figure 2:
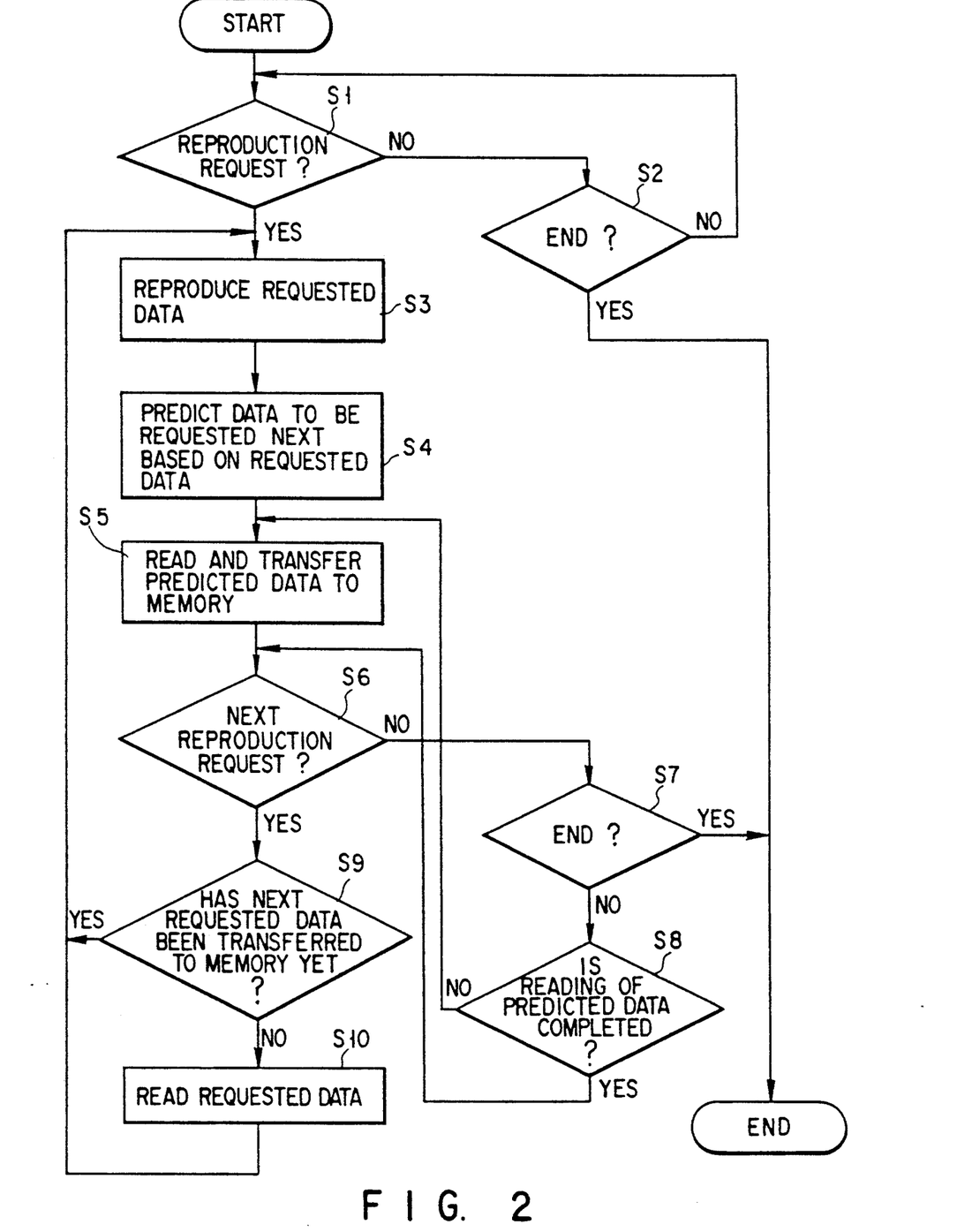
FIG. 2 is a flowchart for explaining a data reproducing method in connection with a first embodiment of the present invention.
Figure 4:
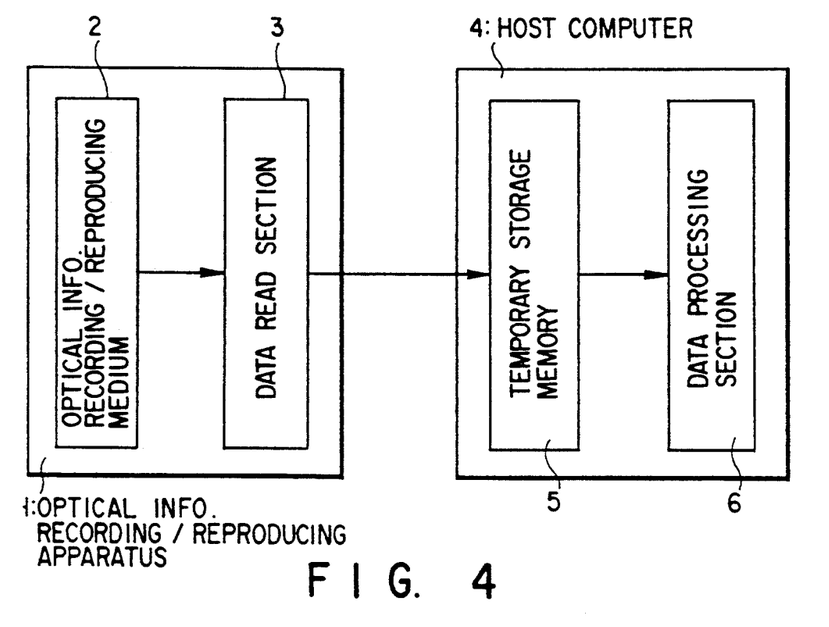
FIG. 4 is a block diagram showing the construction of the data reproducing apparatus according to an embodiment of the present invention.

Referring to FIGS. 2 and 4, a data reproducing method according to a first embodiment of the present invention will be explained.

For example, in a diagnostic recording system using an optical information recording and reproducing medium 2, by giving data attributes obtained in a consultation with a physician and including the name of a disease, the date of consultation, image data or not, and before or after treatment, to the image data recorded on the optical information recording and reproducing medium 2, the data to be specified by a subsequent reproduction request, for example, by the operator from the keyboard (not shown) or the like is predicted based on an attribute of the data currently being reproduced and processed as the reference. For example, if the data presently being processed by the host computer 4 is of internal medicine, it can be predicted that the data to be specified by the next reproduction request will be of internal medicine again. A more detailed explanation of data prediction will be found in embodiments described later.

When the program is started, the host computer 4 judges whether or not a reproduction request specifying a particular data set having the data attributes entered by the operator from the keyboard has been entered (step S1), the data set being part of the image data recorded on the optical information recording and reproducing medium 2. If no reproduction request has been entered, it judges whether or not the program end has been reached (step S2). If it is not the program end, control returns to step S1.

On the other hand, if a reproduction request has occurred, the requested data is read out by the data read section 3 of the optical information recording and reproducing apparatus 1, and is then sent by DMA transfer to the temporary storage memory 5 such as a RAM (Random Access Memory), for reproduction (step S3). Then, the data processing section 6 reads the data from the temporary storage memory 5 and performs specified data processing.

In the meantime, the host computer 4, making use of the period of time when the data processing section 6 is processing the requested data, predicts the data to be specified by the next reproduction request, on the basis of the data attributes initially entered. The predicted data is read by the data read section 3 from the optical information recording and reproducing medium 2, and then written into the temporary storage memory 5 through DMA transfer (steps S4 and S5).

After the predicted data has been transferred to the temporary storage memory 5, it is judged whether or not the next data reproduction request has taken place (step S6). If neither reproduction request nor program end request has occurred, it is judged whether or not the reading of the second data predicted at step S4 has all been completed (steps S7 and S8).

If all predicted data sets are not transferred, the same procedure will be executed from step S5 again, If all predicted data sets have been transferred, execution will be started from step S6.

If at step S6, it is judged that the next data reproduction request has taken place, a judgment will be made to see if the data next requested has already been transferred to the temporary storage memory 5 (step S9). If it has not been yet, the data read section 3 will read the next requested data from the optical information recording and reproducing medium 2 (step S10). The procedure is then repeated from step S3. The judgment at step S9 is made by comparing the file name concerning the data attributes entered at the second reproduction request with the file name of the data transferred to the temporary storage memory 5.

As described above, with this embodiment, the data to be specified by the next reproduction request is predicted on the basis of the data attributes entered at the previous reproduction request. During the time when the data specified by the previous reproduction request is being processed, the predicted data to be specified by the next reproduction request is sent by DMA transfer from the optical information recording and reproducing medium 2 to the temporary storage memory 5. If the next reproduction request has actually occurred, the predicted data can be reproduced and processed without reading the data from the optical information recording and reproducing medium 2, thereby shortening the data reproduction time.

Figure 3:
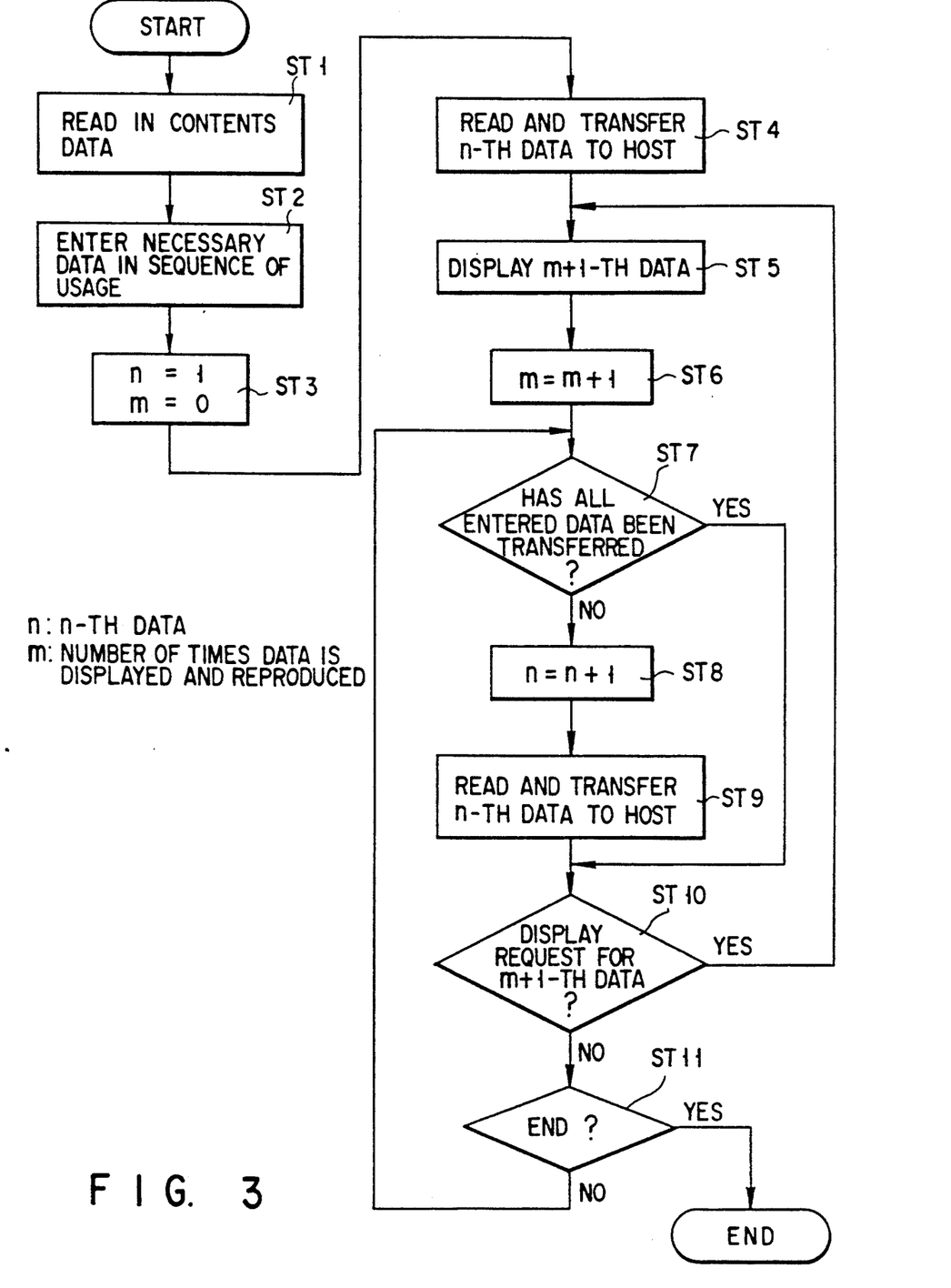
FIG. 3 is a flowchart for explaining a data reproducing method according to a second embodiment of the present invention.

A second embodiment of the present invention will be explained, referring to FIGS. 3 and 4.

In this embodiment, only a certain feature of each data item is extracted: for example, in the case of image data, pixels of the image are thinned out or the volume of data per pixel is reduced, to the extent that you can tell what it is about; in the case of text data, the title is extracted; and in the case of medical examination data, diagnosis date or an attribute briefly describing the feature of diagnosis result is obtained. What is extracted this way is divided into groups of a specified number of images, for example, 100 to 200 images. These groups are previously stored as contents data in the optical information recording and reproducing medium 2.

Later, while referring to the contents data on the CRT (not shown), the operator enters into the program the necessary data at that time, for example, five images of data and the sequence in which the data is to be read. According to the entered sequence, the data recorded on the optical information recording and reproducing medium 2 is written in the data temporary storage memory 5, through DMA transfer during the data processing, thereby shortening the time from when the reproduction request has occurred until data processing begins, as with the first embodiment.

The above method will be described in detail, referring to the flowchart in FIG. 3. After the program has started to run, all images of the data (the contents data), for example, 100 to 200 images, specifying the features of all pieces of data stored in the optical information recording and reproducing medium 2, are read into the host computer 4 (step ST1). The operator, referring to them on the CRT (not shown), makes a reproduction request by entering to the program, for example, five images of data, and their reproduction sequence (step ST2).

Step ST3 is the step of initializing n indicating which one of the data items entered has been read and transferred, and m indicating which one of the data transferred to the host computer 4 has been processed.

Then, the data to be first reproduced entered at step ST2 (the n-th data where n=1) is read from the optical information recording and reproducing medium 2 and then transferred to the host computer 4 (step ST4). The data transferred (the m+1-th data where m=1) undergoes data processing such as data display (step ST5), and 1 is added to m counting the number of data processes (step ST6).

As with the first embodiment, if not all data, for example five images of data, entered during the time of data processing has been transferred to the host computer 4 yet (step ST7), the n+1-th entered data set is transferred to the host computer 4 (steps ST8 and ST9).

At this time, a reproduction request is made for the data set next to the data currently being processed at the time of completion of a data transfer (in this case, the m+1=2nd data set), the same procedure is repeated from step ST5. If no reproduction request for the m+1-th data set has taken place, a program end judgment will be made (steps ST10 and ST11). If a program end request has occurred, the program will be terminated. If no program end request has taken place, the processes at step ST7 and later will be repeated until five images of data read have been transferred (refer to the case where no second reproduction request has occurred in FIG. 1C).

If at step ST7, it is judged that all data entered, for example, five images of data, have been transferred from the optical information recording and reproducing medium 2 to the host computer 4, control waits for the next data display request or program end request.

As described above, with this embodiment, immediately after the start of the program, reproduction request data and the sequence of reproduction requests are entered, making use of the contents data indicating the features of all data sets recorded on the optical information recording and reproducing medium 2. This makes it possible to read the n+1-th data, n+2-th data, . . . from the optical information recording and reproducing medium 2 at the time when the n-th data is being processed. This approach, when the n+1-th, and n+2-th data requests actually occur, allows the retrieval of the corresponding data set without reading them from the optical information recording and reproducing medium 2 whenever each request occurs. This helps to shorten the data reproduction time remarkably.

A third embodiment of the present invention will be explained.

In this embodiment, while a certain data set is being processed by the host computer 4, the data to be specified by the next reproduction request is predicted beforehand on the basis of statistical data. This predicted data is transferred from the optical information recording and reproducing medium 2 to the temporary storage memory of the host computer 4. Based on the fact that the data recorded on the optical information recording and reproducing medium 2 is reproduced hundreds of times, and on the fact that the data is fixed on the optical information recording and reproducing medium 2, statistical data on the fact which data is reproduced after a certain data set has been reproduced is recorded on the optical information recording and reproducing medium 2 each time a data set is reproduced from the medium 2. When the reproduction sequence statistical data is reproduced and a certain pattern is found, the host computer predicts the data to be specified by the next reproduction request, reads the data in advance as with the first and second embodiments, and stores the read-out data in its temporary storage memory 5.

The fourth embodiment of the present invention will be explained, referring to FIGS. 4 and 7.

Figure 7:
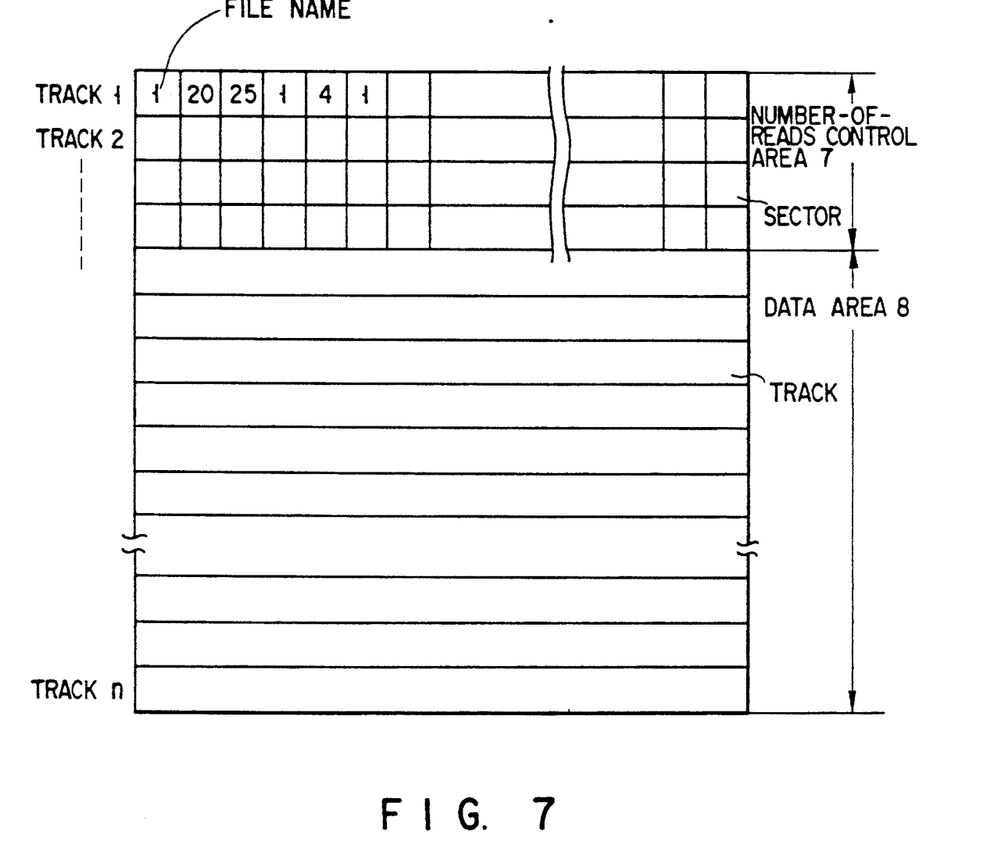
FIG. 7 is a diagram illustrating the data storage areas of the optical card in a fourth and a fifth embodiment of the present invention.

FIG. 7 shows a data recording area of an optical card as an example of the optical information recording and reproducing medium 2. As shown in the figure, the data recording area is divided into a number-of-reads control area 7 and the data area 8. The number-of-reads control area 7 has each track divided into 16 or more sectors, which enables the recording of as many data sets of small capacity as possible.

In the data area 8, desired data sets are recorded according to the usage of the optical card. For example, when an optical card is used as a health care card, the data on the card user's yearly blood pressure, height, weight, urine analysis result, and others is recorded.

Whenever a particular data set is read from the data recorded in the data area 8 of the optical card, the file name or address of the data is recorded in the number of reads control area 7.

Thus, by reading sequentially the data stored in the number-of-reads control area 7, it is possible to distinguish the data sets frequently read in a certain period of time when the optical card is used repeatedly, from those less frequently read.

Instead of recording the file name or address of the data set to be read in the number-of-reads control area 7, it may be recorded in the file managed on the application software using the optical card. It should be noted that in the case of using more than one optical card, it is necessary to make each optical card correspond to the file name.

In this embodiment, based on the data on the number of reads obtained by sequentially reading the data sets recorded in the number-of-read control area 7, the most frequently read data set is first read and transferred to the temporary storage memory 5, as with the first to third embodiments. Thus, when an actual data read request takes place, the data set to be requested with a high probability is surely transferred to the temporary storage memory 5. This makes it possible to perform the reproduction and processing of the data set without directly reading data from the optical card, thereby shortening the data reproduction time.

A fifth embodiment of the present invention will be explained. In this embodiment, when data is recorded on the optical information recording and reproducing medium 2, the characteristic of the data and the division data determined according to the characteristic are recorded at the same time. Based on the recorded characteristic and division data, the next reproduction request data is predicted and then transferred to the temporary storage memory 5.

More specifically, when a tomographic diagnostic system with an optical card is used to record medical image data on a particular patient onto the optical card, the data set is assigned priority according to the condition of the patient. For example, when the patient shows symptoms of a particular disease, the image data to be recorded is given high priority. In contrast, for the image data to be recorded as reference data, it will be given low priority. When the image data on the optical card is reproduced, the image data with the highest priority is first read, as with the first to third embodiments, and then stored in the temporary storage memory 5.

In a medical examination system, data is often managed in time sequence, and the latest data tends to be read first. Making use of this, data may be read from the file recorded on the optical card of the latest file creation date, as with the first to third embodiments, and is transferred to the temporary storage memory 5.

The file name is given its data attribute: for example, of the data sets recorded on the optical card, if the initial letter of the file name is A, it is determined that the data set indicates literature on a particular field, and if the initial letter is B, it is determined that the data set represents literature on another field. The data whose attribute is the same as that of the data presently being reproduced is read out, as with the first to third embodiments, and is transferred to the temporary storage memory 5.

Figure 5:
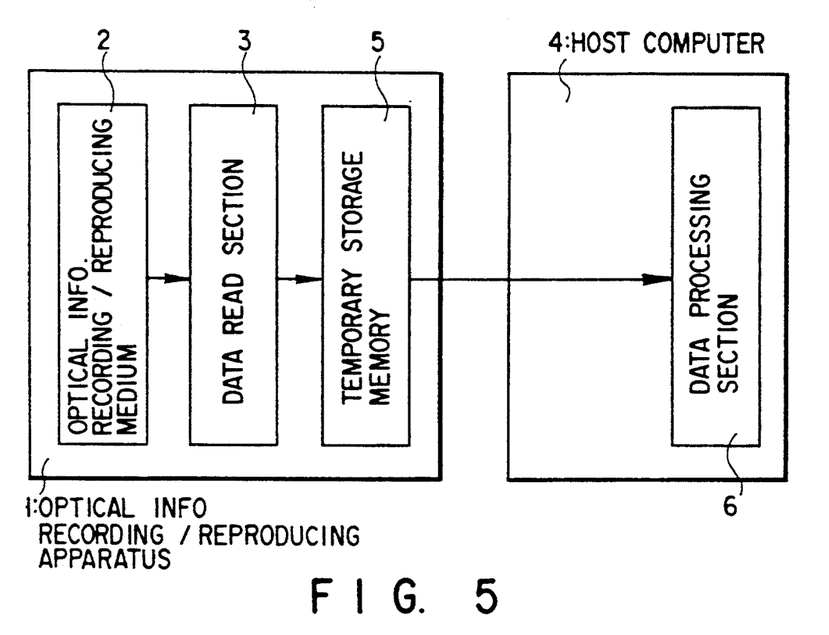
FIG. 5 is a block diagram showing another construction of the data reproducing apparatus.

While in the above embodiments, the temporary storage memory 5 is in the host computer 4, the present invention is not restricted to this configuration. For example, it may be provided in the optical information recording and reproducing apparatus 1 as shown in FIG. 5, or may be installed in the form of a memory box outside the host computer 4 or the optical information recording and reproducing apparatus 1.

Figure 6:
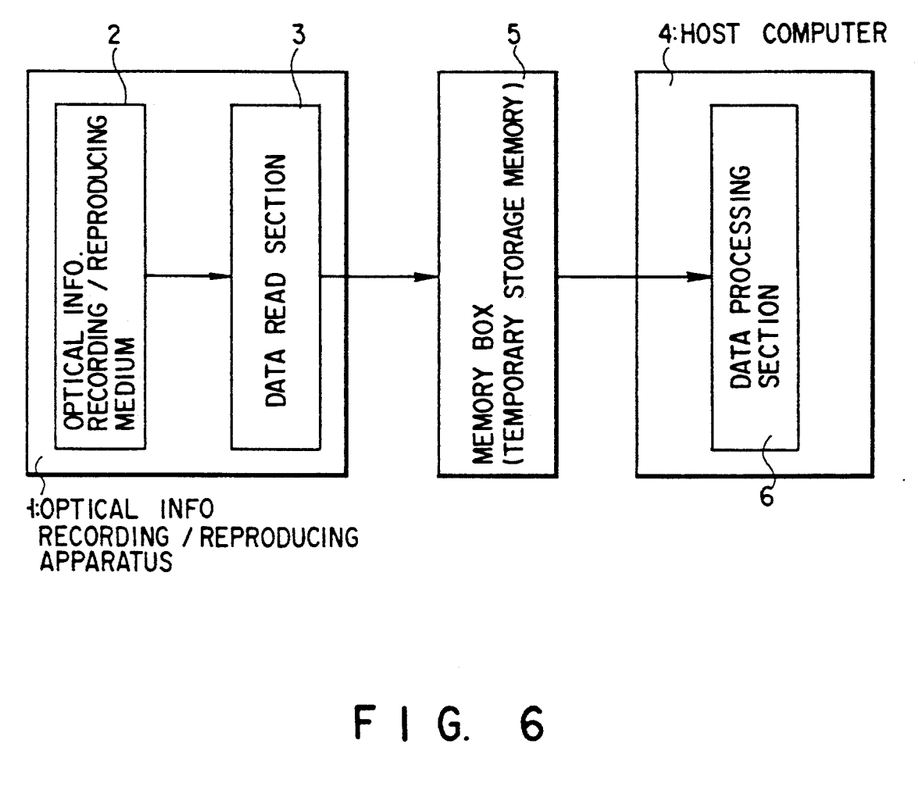
FIG. 6 is a block diagram showing still another construction of the data reproducing apparatus.

Since in the FIG. 4 arrangement, the optical information recording and reproducing apparatus 1 has no temporary storage memory 5, it has the advantage of making production cost low. The arrangement of FIG. 5 has the advantage of imposing no burden on the host computer 4 during the data processing. In addition to this advantage, the configuration of FIG. 6 also has the advantage of making the optical information recording and reproducing apparatus 1 less expensive.

As noted earlier, because the temporary storage memory 5 is composed of a RAM, the host computer 4 or the optical information recording and reproducing apparatus 1 is turned off, the stored data is erased. In the case of using a laser card, for security reasons, for example, the data may be erased at the time of the program end.

As described so far, with the above embodiments, each time the next reproduction request occurs for a corresponding data set recorded on the optical information recording and reproducing medium, it is not necessary to read the data set from the medium, thereby shortening the total time required to reproduce the data sets from the medium in response to a plurality of reproduction requests.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data reproducing method comprising the steps of:

causing an optical information recording and reproducing apparatus to read out first data from an optical information recording and reproducing medium when a first reproduction request is received;

storing the read out first data in a temporary storage memory;

causing a host computer to process the stored first data;

predicting second data that is expected to be specified by a second reproduction request, on the basis of a characteristic of the stored first data during at least one of a data processing period of the host computer and a period of time required by the host computer to store the first data in the temporary storage memory; and reading out the predicted second data from the optical information recording and reproducing medium and then transferring the read out predicted second data to the temporary storage memory, before the second reproduction request is received.

2. A data reproducing method according to claim 1, wherein the optical information recording and reproducing medium comprises an optical card.

3. A data reproducing method according to claim 1, wherein the optical information recording and reproducing medium comprises an optical disk.

4. A data reproducing method according to claim 1, wherein the predicting step includes the step of predicting an second data based on the attribute of the first data read responsive to the first reproduction request.

5. A data reproducing method according to claim 1, wherein the predicting step comprises a step of predicting the second data based on a statistical characteristic of the first data read responsive to the first reproduction request.

6. A data reproducing method according to claim 1, wherein the predicting step comprises th step of predicting the second data based on how frequently the second data has been requested in the past after the first data has been requested.

7. A data reproducing method according to claim 1, wherein the predicting step comprises a step of predicting the second data based on a division of data determined according to a data characteristic of the first data.

8. A data reproducing method according to claim 1, wherein the predicting step comprises the step of specifying the second data to be read immediately after the first data is read at th first reproduction request.

9. A data reproducing method according to claim 7, wherein the division of data is a function of a priority of data reproduction based on a characteristic of said first data.

10. A data reproducing method according to claim 1, wherein the temporary storage memory is one of inside and outside the host computer and one of inside and outside the optical information recording and reproducing apparatus.

11. A data reproducing apparatus comprising:
storing means for storing in a temporary storage memory first data read out by an optical information recording and reproducing apparatus from an optical information recording and reproducing medium when a first reproduction request is received;
processing means for processing the read out first data stored in the storing means;
predicting means for predicting second data that is expected to be specified by a second reproduction request, based on a characteristic of the first data, during at least one of a data processing period of a host computer and a period of time required for storing the first data in the temporary storage memory; and
transferring means for reading out the second data predicted by the predicting means from the optical information recording and reproducing medium and for then transferring the read out second data to the temporary storage memory, before the second reproduction request is received.

12. A data reproducing apparatus according to claim 11, wherein the optical information recording and reproducing medium comprises an optical card.

13. A data reproducing apparatus according to claim 11, wherein the optical information recording and reproducing medium comprises an optical disk.

14. A data reproducing apparatus according to claim 11, wherein the predicting means comprises means for predicting the second data based on an attribute of the first data read when the first reproduction request is received.

15. A data reproducing apparatus according to claim 11, wherein the predicting means comprises means for predicting the second data based on a statistical characteristic of the first data read responsive to the first reproduction request.

16. A data reproducing apparatus according to claim 11, wherein the predicting means includes means for predicting the second data based on how frequently the second data had been read in the past after the first data was requested.

17. A data reproducing apparatus according to claim 11, wherein the predicting means includes means for predicting the second data based on a division of data determined according to at least one characteristic of the first data.

18. A data reproducing apparatus according to claim 11, wherein the temporary storage memory is one of inside and outside the host computer and one of inside and outside the optical information recording and reproducing apparatus.

19. A data reproducing apparatus according to claim 11, wherein the predicting means comprises means for specifying said second data to be read immediately after the first data is read when the first reproduction request is received.

20. A data reproducing apparatus according to claim 17, wherein the division of data is a function of a priority of data reproduction a data characteristics based on a characteristic of the first data.

* * * * *

UNITED STATES PATENT AND TRADEMARK OFFICE
CERTIFICATE OF CORRECTION

PATENT NO. : 5,331,613
DATED : 19 July 1994
INVENTOR(S) : Naoki YAMADA It is certified that error appears in the above-identified patent and that said Letters Patent is hereby corrected as shown below:

In the Title page, Section [57] ABSTRACT line 9, after "data that" insert --is expected to be--

Signed and Sealed this

Seventh Day of March, 1995

Attest:

BRUCE LEHMAN

Attesting Officer     Commissioner of Patents and Trademarks